Dec. 1, 1936.  S. P. NEUHAUSEN  2,062,472

HANDLE CLAMP

Filed Feb. 1, 1935

Inventor
Sebastian P. Neuhausen
by Maxwell F. Cargill
Attorney.

Patented Dec. 1, 1936

2,062,472

UNITED STATES PATENT OFFICE 2,062,472

HANDLE CLAMP

Sebastian P. Neuhausen, Lombard, Ill., assignor to Stampit Corporation, Lombard, Ill., a corporation of Illinois Application February 1, 1935, Serial No. 4,543

3 Claims. (Cl. 306—1)

This invention relates to improvements in handle clamps.

In packing rakes of the type shown in my U. S. Patent No. 1,937,775, granted Dec. 5, 1933, for shipment, the fixed handle clamps therein shown do not permit the rakes to be arranged in cartons in the most economical manner as to space, although the detachable handles are packaged separately. It is an object of the present invention to provide handle clamps for rakes or other garden or lawn implements which are detachable from the implements as well as from the handles thereof, whereby quantities of the implements can be wrapped or packed in compactly stacked relation.

Another object of the invention is to provide a clamp which can be attached readily to a rake or like implement and which so cooperates with the handle thereof as to form a rigid connection between the handle and rake.

Other objects relate to various features of construction and arrangement of parts which will be apparent from a consideration of the following specification and accompanying drawing, wherein.

Figure 1:
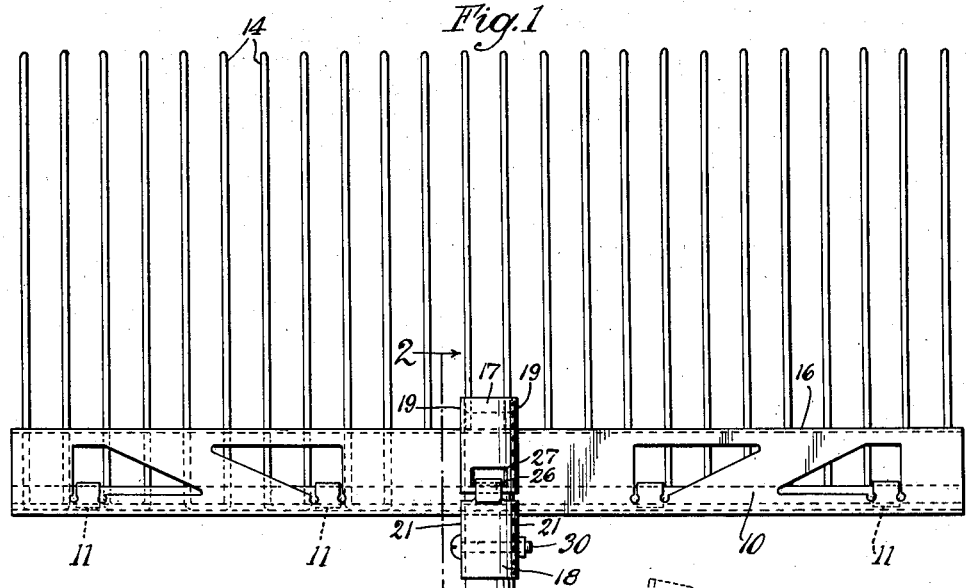
Figure 1 is a broken top plan view of a rake and handle connected by a clamp embodying the present improvements.
Figure 3:
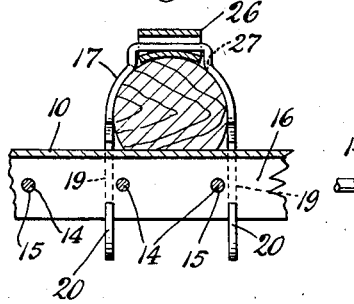
Figure 3 is a section taken on line 3—3 of Figure 2.

In the drawing illustrating one embodiment of the invention 10 is a cross-head or tine carrying member of the rake. The member 10 is formed of sheet metal of channel form and is provided with tongues 11 which are bent partially around the strip 12 for holding the same in position in the channel.

The strip 12 is provided with openings 13 through which project the tines 14, the latter of which are of U shape and also extend through openings 15 in the forward flange 16 of the member 10.

Heretofore rakes of this type have been manufactured with a socket member for the handle riveted or welded to the upper surface of the channel 10. The fixed socket member precluded the most economical packing of the rakes for shipment since the sockets prevent the stacking of the rakes in the most compact form.

The clamp forming the subject matter of the present invention is detachable from the rake as well as from the handle and can be shipped in detached relation to purchasers of rakes for assembly by them.

The clamp comprises two sections 17 and 18 which, in the preferred form illustrated, are of inverted U-shape generally. The forward section 17 is provided with a pair of downwardly extending arms 19 having terminal projections 20 which are shown as being of hook-like form to fit over the lower edge of the forward flange 16 of the cross-head 10. The section 18 is provided with arms 21 having projections 22 which extend under the rear edge of the member 10 and strip 12 and preferably have hook-like ends 23 for engaging the forward edges of the said strip.

The strip 12 being of wood, the extensions 22 and 23 preferably have taps or flanges 24 and 25 to provide larger surfaces of contact with the strips 12 than would be afforded by the edges of the sheet material of which the clamp sections are formed.

The sections 17 and 18 preferably are connected together by a tongue 26 passing through an opening 27 in the section 17 to provide an articulate structure. An advantage of connecting the sections against separation is that the two parts can be shipped in such assembled relation and the purchaser of the rakes, as the retailer, for example, will have fewer separate parts to handle although, as will be seen, the tongue 26 may be in the form of an open hook for attaching the two sections together at the time the clamp is placed in use on a rake.

Figure 2:
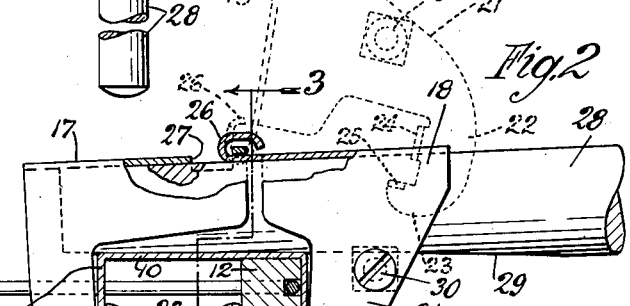
Figure 2 is an enlarged broken sectional view taken on line 2—2 of Figure 1.
Figure 4:
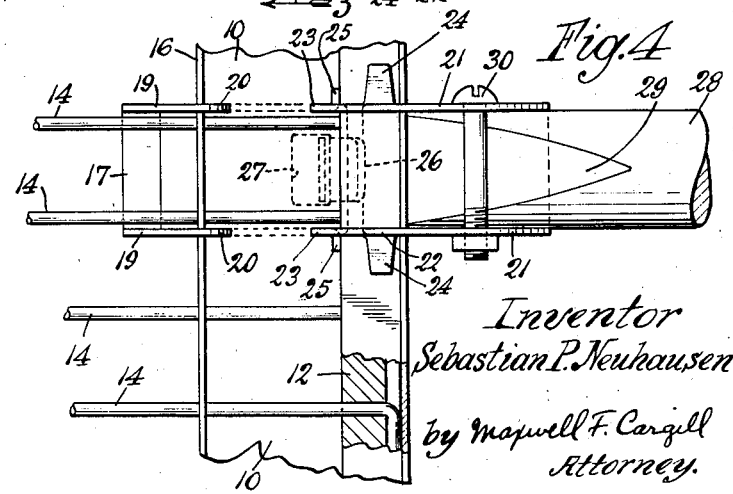
Figure 4 is an enlarged broken bottom plan view of a rake and handle and the improved clamp.

In placing the clamp on a rake the section 17 is first tilted to enable the same to hook over the first flange 16 of the member 10 and then turned clockwise to the position shown in Figure 2. The articulate or hinged construction enables the section 18 to be turned counter-clockwise relatively to the section 17, as suggested by the dotted line position of the former shown in Figure 2, while the latter is being placed in position. The section 18 can then be swung to the full line position.

The handle 28, having a chamfered or beveled face 29, is then forced into the socket formed by the upper curved portions of the members 17 and 18 which with the adjacent portion of the member 10 define a handle socket. The wedging action of the handle as it is pressed into the socket, forces the arms 19 and 22 and extensions 20 and 23 into rigid engagement with the rake.

A bolt 30 extends between the two extensions 21 by means of which the extensions can be drawn tightly against the handle 28 to prevent withdrawal of the latter from the socket.

While I have shown and described an embodiment of my improvements for the purpose of illustration, I do not wish to be restricted specifically thereto except as so limited by the appended claims.

I claim:

1. A clamp of the type described comprising a pair of articulated members of inverted U shape and having downwardly directed arms terminating in oppositely directed hooks for engaging front and rear portions of the cross-head of an implement, the upper portions of said members defining between the same and said cross-head a socket for receiving a wedge end of a handle whereby said members are rigidly secured to said cross-head, and means carried by one of said members for preventing withdrawal of said handle from said socket.

2. Means for connecting a handle to a rake having a transverse tine carrying member comprising a pair of hingedly connected clamp sections having cooperating arms for detachably engaging front and rear portions of said member, said sections defining with a portion of the upper surface of said member a socket for the reception of a handle shaped to wedge said sections rigidly to said member, and means for securing the handle to one of said clamp sections to prevent withdrawal of the handle from wedging position within the socket.

3. A clamp for securing a handle to a rake having a transverse tine carrying member, comprising a pair of alined sections of inverted U shape and each provided with a pair of depending arms for engaging portions of said member at the front and rear edges thereof and defining with a portion of the upper surface of said member a socket for receiving a wedge end of a handle, means hingedly securing said sections together whereby the same can be placed successively into position on said member to be wedged thereon upon insertion of the handle in said socket, and means for securing said handle to one of said sections for preventing the withdrawal thereof.

SEBASTIAN P. NEUHAUSEN.